W. N. THURMAN.
SAW GRUB PLOW.
APPLICATION FILED JUNE 30, 1908.

925,613.

Patented June 22, 1909.
2 SHEETS—SHEET 1.

Inventor
W. N. Thurman

Witnesses

By Horace B. Lacey, Attorneys

W. N. THURMAN.
SAW GRUB PLOW.
APPLICATION FILED JUNE 30, 1908.
925,613.
Patented June 22, 1909.
2 SHEETS—SHEET 2.
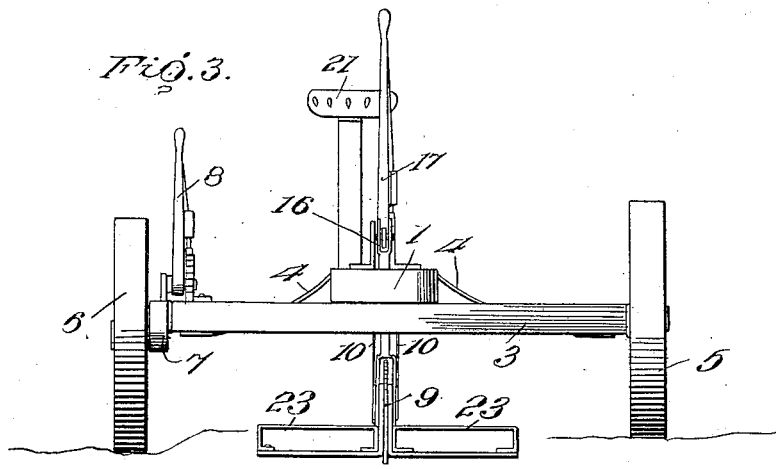
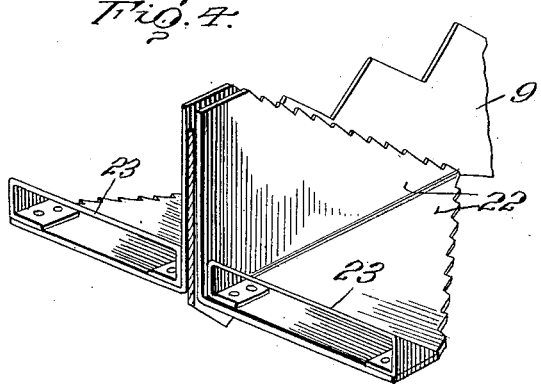
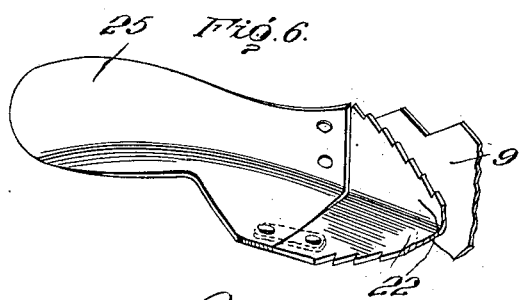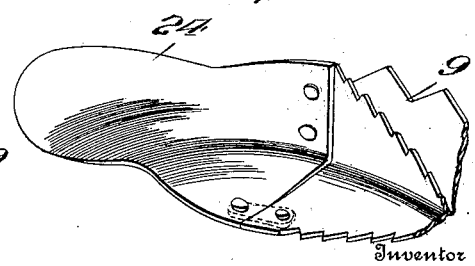
W. N. Thurman, Inventor

UNITED STATES PATENT OFFICE.

WILLIAM N. THURMAN, OF MOUNDS, OKLAHOMA.

SAW GRUB-PLOW.

No. 925,613.   Specification of Letters Patent.   Patented June 22, 1909.

Application filed June 30, 1908. Serial No. 441,095.

*To all whom it may concern:*

Be it known that I, WILLIAM N. THURMAN, citizen of the United States, residing at Mounds, in the county of Creek and State of Oklahoma, have invented certain new and useful Improvements in Saw Grub-Plows, of which the following is a specification.

The present invention relates to implements designed most especially for use in the field for preparing the soil for reception of seed.

The invention is intended to provide a plow of novel form either for breaking new land or for opening soil which has already been tilled, the implement being light running and adapted to penetrate turf or remove roots and loosen and lighten the surface after turning the same under, with the result that better results are obtained in the way of harvest, all other conditions being equal.

For a full understanding of the invention and the merits thereof and also to acquire a knowledge of the details of construction and the means for effecting the result, reference is to be had to the following description and accompanying drawings.

Figure 1:
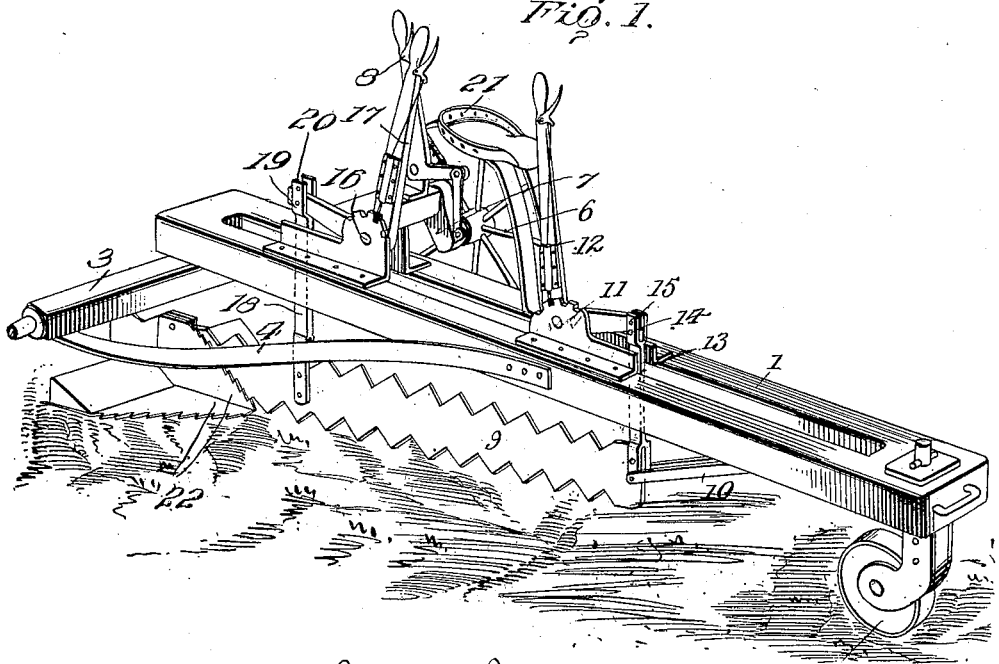
Figure 2:
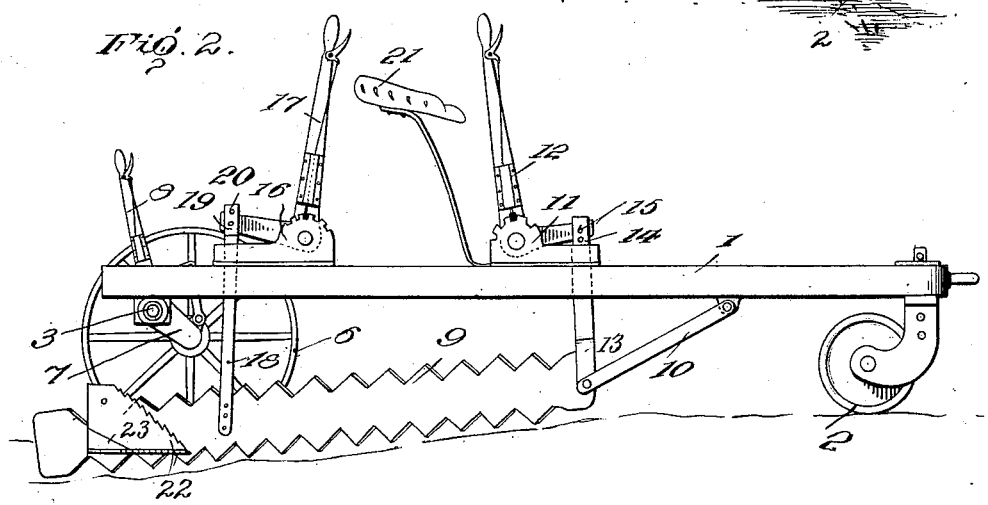

While the invention may be adapted to different forms and conditions by changes in the structure and minor details without departing from the spirit or essential features thereof, still the preferred embodiment is shown in the accompanying drawings, in which:

Figure 1 is a perspective view of a saw grub plow embodying the invention. Fig. 2 is a side view of the plow, the inner wheel being omitted. Fig. 3 is a rear view. Fig. 4 is a rear perspective view of the rear portion of the saw, showing the plows fitted thereto. Fig. 5 is a detail perspective view of a modification showing the rear portion of the saw having the mold board fitted thereto for turning old ground. Fig. 6 is a detail perspective view of a further modification showing the rear portion of the saw, having the mold board fitted thereto for turning prairie sod.

Corresponding and like parts are referred to in the following description and indicated in all the views of the drawings by the same reference characters.

The implement comprises a beam 1 to which the draft is to be applied in any manner for drawing the plow over the field. A caster wheel 2 is provided at the front end of the beam for supporting the same. An axle 3 is fitted to the rear end of the beam 1 and is strengthened by braces 4. A ground wheel 5 is mounted upon a spindle or arm at the right hand end of the axle 3. A ground wheel 6 is provided at the left hand end of the axle 3 and is mounted upon an arm or spindle projected outward from a crank 7 which is adjustable, being moved by means of a lever 8 which is provided with the usual latch bolt and toothed segment for holding the crank in the adjusted position. This construction admits of leveling the implement when used in tilling rolling land. A saw 9 is located below the beam 1 and opposite edges are similarly toothed, thereby admitting of the saw being reversed both end for end and top for top, thereby presenting in effect four sets of teeth so that when one set becomes dull, the saw may be changed and another set of sharp teeth brought into operative position.

The saw has a horizontal arrangement so as to bring its teeth in position for grubbing and cutting turf or the like. The saw is adjustable vertically at both ends. A draft link 10 connects the front end of the saw 9 with the front portion of the beam 1. A bracket 11 is mounted upon the beam 1 and forms a mount for a lever 12 which is connected by means of a link 13 with the front end of the saw 9. The lever 12 is provided with a latch bolt which is adapted to coöperate with teeth of the bracket 11 to secure the said lever 12 and the front end of the saw 9 in the required adjusted position. The lever 12 is mounted between complemental parts forming the bracket 11 and the link 13 passes between said parts and is provided in its length with a series of openings 14 to receive a pin 15 which is passed through transversely alined openings formed in the parts of the bracket 11, thereby serving to secure the saw in adjusted position and thus holding the lever 12 and its latch bolt and coöperating teeth in rigid relation to the bracket 11. A bracket 16 similar in construction to the bracket 11 is mounted upon the rear portion of the beam 1 and supports a lever 17 which is connected with the rear portion of the saw 9 by means of a link 18. The lever 17 is provided with a latch bolt which coöperates with a toothed portion of the bracket 16 to hold the lever and rear end of the saw in the required adjusted position. A pin 19 is adapted to pass through openings of the bracket 16 and one of a series of openings 20 formed in the link 18 for a purpose similar to the pin 15, namely, to hold the rear portion of the saw 9 in the required adjusted position and thereby insure the lever 17 and adjunctive parts from all strain when in such locked position. The driver's seat 21 is conveniently located upon the beam 1 to admit of both levers 12 and 17 being conveniently reached for operation when required.

A shovel blade is fitted to the rear end of the saw 9, one being located upon each side thereof. These shovel blades are of like formation and their front edges are toothed so as to cut roots and penetrate the soil more readily. Each shovel blade comprises two wings 22, which have a right angular arrangement, one of the wings being secured to a side of the saw 9 and occupying a vertical position and the other wing projecting horizontally from the saw so as to run under the soil to the requisite depth and cut through roots. A lifter 23 is fitted to the rear portion of the horizontal wing and inclines upwardly and rearwardly, the purpose being to loosen and lighten the soil above the horizontal wing and thereby prepare the same for reception of seed without turning the top soil under. The lifter 23 may be fitted to either wing of the shovel blade, it being understood that when it is required to bring the vertical wings into horizontal position the shovel blades are changed from one side of the saw to the other. The vertical wings of the shovel blades in addition to strengthening and stiffening the rear portion of the saw 9, also provide attaching means for connecting said shovel blades to the saw.

When the implement is adapted for turning old ground the left-hand shovel blade is removed from the saw 9 and a mold board 24 fitted to the saw and the end shovel blade, as indicated most clearly in Fig. 5. For turning prairie sod or turf the mold board 25 is attached to the saw and right-hand shovel blade, as indicated most clearly in Fig. 6. It is to be understood that the lifter 23 is omitted when the mold boards 24 and 25 are placed in position, said mold boards serving to turn the soil or turf as the case may be. The saw 9 cuts through roots, sod, turf and the like, thereby enabling both shovel blades attached to the rear end of the saw to operate in the manner stated and loosening and lightening the soil. The lifters 23 simply elevate the soil without turning the same under and this is of advantage under certain conditions. When the soil is to be turned under, the mold boards 24 and 25 are placed in position according to the particular nature of the soil and the character of work required to be performed.

Having thus described the invention, what is claimed as new is:

1. In a plow of the character described, the combination of a beam, a saw mounted beneath said beam, and shovel blades positioned in registered relation upon the opposite sides of said saw.

2. In a plow of the character described, the combination of a beam, supports adjustably dependent from the opposite ends of said beam, a saw detachably engaged between said supports at the lower extremities thereof and a pair of shovel blades carried in registered relation upon the opposite sides of said saw at the rear end thereof.

3. In a plow of the character described, the combination of a beam, brackets positioned upon the upper face of said beam at the opposite ends thereof, levers of I formation fulcrumed in said brackets, supports depended from the arms of said levers and passed through said brackets and said beam, a saw detachably engaged at the opposite extremities to the lower ends of said supports, shovel blades interchangeably positioned in registered relation upon the opposite sides of said saw, and lifters fitted to the horizontal rear portions of said blades for the purpose of raising soil without overturning the same.

In testimony whereof I affix my signature in presence of two witnesses.

WILLIAM N. THURMAN. [L. S.]

Witnesses:
   JOHN R. TARRANT,
   NORA BELT.